United States Patent
Coelho et al.

(10) Patent No.: US 10,300,416 B2
(45) Date of Patent: May 28, 2019

(54) LIQUID MIST SEPARATION DEVICE

(71) Applicant: Mahle International GmbH, Stuttgart (DE)

(72) Inventors: Armando Coelho, Stuttgart (DE); Alfred Elsaesser, Keltern (DE); Volker Kirschner, Muehlacker (DE); Thomas Riemay, Korb (DE); Stefan Ruppel, Heidelberg Emmertsgrund (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/083,473

(22) PCT Filed: Feb. 15, 2017

(86) PCT No.: PCT/EP2017/053406
§ 371 (c)(1),
(2) Date: Sep. 7, 2018

(87) PCT Pub. No.: WO2017/153137
PCT Pub. Date: Sep. 14, 2017

(65) Prior Publication Data
US 2019/0070543 A1 Mar. 7, 2019

(30) Foreign Application Priority Data

Mar. 8, 2016 (DE) .......................... 10 2016 203 770

(51) Int. Cl.
*B01D 45/00* (2006.01)
*B01D 45/08* (2006.01)
(Continued)

(52) U.S. Cl.
CPC ......... *B01D 45/08* (2013.01); *F01M 13/0011* (2013.01); *F01M 13/04* (2013.01);
(Continued)

(58) Field of Classification Search
CPC ....................................................... B01D 45/08
(Continued)

(56) References Cited

U.S. PATENT DOCUMENTS 7,648,543 B2 * 1/2010 Faber ..................... B01D 45/08
55/329
7,964,009 B2 6/2011 Herman et al.
(Continued)

FOREIGN PATENT DOCUMENTS

DE  10051307 A1  5/2002
DE  102006024816 A1  12/2007
(Continued)

*Primary Examiner* — Robert A Hopkins
(74) *Attorney, Agent, or Firm* — Fishman Stewart PLLC

(57) ABSTRACT

A liquid mist separation device for separating liquid from a gas flow may include a nozzle plate including at least one nozzle which is open at least in part and at least one baffle plate. The device may also include at least one valve element which, together with the nozzle plate, forms at least one variable nozzle. The at least one variable nozzle may be arranged fluidically parallel to the at least one nozzle. The nozzle plate and the at least one valve element may be arranged axially displaceable relative to each other. The nozzle plate and the at least one baffle plate may be disposed at a fixed distance with respect to one another. Opposite the at least one nozzle and the at least one variable nozzle a baffle plate may be arranged, which deflects the gas flow emerging from the respective nozzle and on which liquid droplets precipitate.

20 Claims, 4 Drawing Sheets

(51) Int. Cl.
 *F01M 13/00* (2006.01)
 *F01M 13/04* (2006.01)

(52) U.S. Cl.
 CPC .............. *F01M 2013/045* (2013.01); *F01M 2013/0433* (2013.01)

(58) Field of Classification Search
 USPC .................................. 55/462, 465, DIG. 19
 See application file for complete search history.

(56) References Cited

U.S. PATENT DOCUMENTS

| | | |
|---|---|---|
| 8,607,767 B2 | 12/2013 | Ruppel et al. |
| 2003/0075046 A1 | 4/2003 | Lenzing |
| 2008/0155949 A1 | 7/2008 | Dunsch et al. |
| 2012/0192536 A1 | 8/2012 | Severance et al. |
| 2015/0128542 A1 | 5/2015 | Severance et al. |

FOREIGN PATENT DOCUMENTS

| | | |
|---|---|---|
| DE | 11 2010 001 367 T5 | 5/2012 |
| EP | 2 963 258 A1 | 1/2016 |
| WO | WO-2011/089006 A1 | 7/2011 |
| WO | WO-2016/001 004 A1 | 1/2016 |

* cited by examiner

LIQUID MIST SEPARATION DEVICE

CROSS-REFERENCE TO RELATED APPLICATIONS

This application claims priority to International Patent Application No. PCT/EP2017/053406, filed on Feb. 15, 2017, and German Patent Application No. DE 10 2016 203 770.6, filed on Mar. 8, 2016, the contents of both of which are hereby incorporated by reference in their entirety.

TECHNICAL FIELD

The invention relates to a liquid mist separation device for separating liquid from a gas flow, in particular oil from blow-by gas, having a nozzle plate which has at least one nozzle, which is permanently open at least in part, and through which the gas flow flows, having at least one baffle plate arranged opposite the at least one nozzle, which baffle plate deflects the gas flow and on which liquid droplets precipitate.

BACKGROUND

Such liquid mist separation devices are based on an inertia principle. The gas flow is accelerated through the nozzles and directed against the baffle plate. On the baffle plate, the liquid droplets which are carried along in the gas flow are driven out from the gas flow owing to the inertia, and strike onto the baffle plate, on which they remain caught. For an effective liquid mist separation, the speed of flow of the gas flow through the nozzle must be as high as possible. Therefore, the flow cross-section of the nozzles should not be too large. However, a small flow cross-section brings about a high backup and therefore a high loss of pressure. Here, a compromise of the cross-sectional area is expedient, in which the pressure losses are not too high, but the separation is sufficient for the system. This compromise can, however, always only be optimal for one volume flow.

Therefore, it is known to equip the liquid mist separation device with variable nozzles, which have a variable nozzle cross-section, so that at higher through-flow rates the overall nozzle cross-section can enlarge and thereby the loss of pressure which is caused is reduced.

From DE 10 2006 024 816 A1 for example a so-called impactor is known. The impactor has a spring-loaded poppet valve which, on opening, forms an annular gap and therefore forms a variable nozzle.

However, these liquid mist separation devices usually have the disadvantage that the gas flow is deflected before it flows through the at least one nozzle and thereby also loses kinetic energy, whereby a pressure loss is produced.

From WO 2011/089006 A1 a valve is known for controlling a gas flow, in particular in a crankcase ventilation device. Here, a liquid mist separation can be achieved with the valve. For this, several gas through-openings are provided in the valve plate, which function as nozzles. Opposite the valve plate, a separation element is arranged. However, no separation element is associated with the variable valve gap.

From EP 2 963 258 A1 a liquid mist separation device is known, which has a nozzle plate and a baffle plate which is displaceably arranged with respect to the nozzle plate. Projections are arranged on the baffle plate which, depending on the position of the baffle plate, engage into the nozzles of the nozzle plate and therefore influence the cross-section of the nozzles.

SUMMARY

The present invention is based on the problem of providing an improved or at least different embodiment of a liquid mist separation device, which is distinguished in particular by an improved liquid separation with a lower loss of pressure.

This problem is solved according to the invention by the subject of the independent claim(s). Advantageous further developments are the subject of the dependent claim(s).

The invention is based on the general idea to provide a variable nozzle which is arranged fluidically parallel to the at least one nozzle of the nozzle plate and that this variable nozzle is formed in combination with the nozzle plate and with a further valve element. According to the invention, provision is made that the liquid mist separation device has at least one valve element which together with the nozzle plate forms at least one variable nozzle with a variable nozzle cross-section, and that the at least one variable nozzle is arranged fluidically parallel to the at least one nozzle of the nozzle plate. Thereby, through the variable nozzle, an overall nozzle cross-section of the liquid mist separation device can be varied, so that at high through-flow rates of the gas flow through the liquid mist separation device, the occurring counter-pressure and thereby loss of pressure can be reduced. Furthermore, provision is made according to the invention that the nozzle plate and the valve element are arranged so as to be axially displaceable relative to each other. Through the displaceability of the nozzle plate to the valve element, the nozzle cross-section of the nozzle can be adjusted.

In the description and the enclosed claims, the terms radial, axial and circumferential direction refer to the nozzle plate.

In the description and the enclosed claims, a nozzle is understood to mean a through-opening which forms a reduction of the flow cross-section. The through-opening itself can have here a constant nozzle cross-section. In particular, simple bores in a plate are to be understood as a nozzle. The cross-sections of the nozzles are, however, not limited to circles, as in the case of bores. For example, slit-shaped, circular-ring-shaped or arc-shaped nozzle cross-sections are likewise possible.

In addition, provision is made according to the invention that the nozzle plate and the baffle plate have a fixed distance with respect to one another. Through the fixed distance between the nozzle plate and the baffle plate, a high separation rate of the liquid from the gas flow can be enabled.

A further favourable possibility makes provision that the valve element is a movably arranged valve plate, which in a closed position closes an opening of the nozzle plate, and which in an open position forms, together with the nozzle plate, an annular gap, and that a spring element is provided, which acts upon the valve plate with a force in the direction of the closed position. The annular gap is formed by the opening of the nozzle plate and the valve plate. Depending on how far the valve plate is raised from the closed position, the cross-sectional area of the annular gap enlarges and thereby the nozzle cross-section of the variable nozzle. Through the valve plate being acted upon with a force in the direction of the closed position, the valve plate, in a state of rest, in which the gas flow does not flow through the liquid mist separation device, is situated in the closed position. On exceeding a threshold through-flow rate through the liquid mist separation device, the valve plate rises from the closed position and moves into the open position, and therefore frees the variable nozzle.

A particularly favourable possibility makes provision that the nozzle plate and the baffle plate are arranged axially displaceably in the liquid mist separation device. In such a case, the valve element is arranged securely in the liquid mist separation device.

An advantageous solution makes provision that the at least one valve element is a fixed closure body, which in particular is embodied in a cone-shaped or frustoconical manner, that the nozzle plate has an opening per closure body, that in a closed position of the nozzle plate, such closure bodies engage into a corresponding opening of the nozzle plate and close the latter, and that in an open position of the nozzle plate, the opening and the respective closure body form an annular gap. Therefore, for each pair of closure body and opening, a variable nozzle is formed, which with increasing through-flow rate has an enlarging nozzle cross-section at least in a limited range of through-flow rates.

A further advantageous solution makes provision that the at least one valve element is a valve seat which surrounds an opening of an inlet connecting piece, that the nozzle plate, in a closed position of the nozzle plate, lies against the valve seat and covers the opening of the inlet connecting piece, and that in an open position an annular gap is formed between the nozzle plate and the valve seat. Therefore, in the closed position, the entire gas flow is directed through the at least one nozzle of the nozzle plate. When the nozzle plate moves in the direction of the open position, the annular gap forms, which forms the variable nozzle.

A favourable variant makes provision that the at least one valve element is a valve seat which surrounds an opening of an inlet connecting piece, that the nozzle plate, in a closed position of the nozzle plate, lies against the valve seat and covers the opening of the inlet connecting piece, and that in an open position at least one of the nozzles of the nozzle plate is exposed, which in the closed position is covered by the valve seat. Therefore, variable nozzles are formed by at least one of the nozzles in the nozzle plate, which are covered in the closed position.

A further favourable variant makes provision that a spring device is provided, which acts upon the nozzle plate with a force in the direction of the closed position. Thereby, the nozzle plate remains in the closed position up to a threshold through-flow rate. The variable nozzle is only freed above the threshold through-flow rate and therefore increases the overall nozzle cross-section of the liquid mist separation device, in order to reduce the backup and thereby reduce the loss of pressure at the liquid mist separation device in the case of high through-flow rates.

An advantageous possibility makes provision that the at least one variable nozzle and the at least one nozzle of the nozzle plate are directed in a common nozzle direction. Thereby, all the nozzles can be covered by a common baffle plate. Furthermore, it can be achieved that the gas flow does not have to be deflected before it flows through the nozzles. Thereby, the loss of pressure is reduced within the liquid mist separation device.

A further advantageous possibility makes provision that the at least one variable nozzle and the at least one nozzle of the nozzle plate are axially aligned. Thereby, a particularly compact construction of the liquid mist separation device results. Furthermore, the gas flow, which flows axially in through the inlet connecting piece, can be directed through the nozzles without deflection.

In addition, provision is made according to the invention that opposite each nozzle of the nozzle plate and each variable nozzle, a baffle plate is arranged which deflects the gas flow emerging from the respective nozzle and on which liquid droplets precipitate. It shall be understood that also a single shared baffle plate can be arranged, which covers all nozzles. Thereby, the liquid separation can be optimally achieved.

A favourable solution makes provision that up to a threshold through-flow rate, all variable nozzles are closed and the nozzle cross-section of the variable nozzles enlarges with increasing through-flow rates above the threshold through-flow rate. It shall be understood that the nozzle cross-section of the variable nozzle can not enlarge arbitrarily, because the movement of the individual parts with respect to one another is necessarily limited. Through the variable nozzles remaining closed up to the threshold throughflow rate, a counter-pressure which is sufficient for the liquid separation can also be generated at low through-flow rates. The threshold through-flow rate is preferably selected such that the variable nozzles open when a sufficient threshold pressure for the liquid separation is present and a further pressure increase would only lead to an unnecessary loss.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
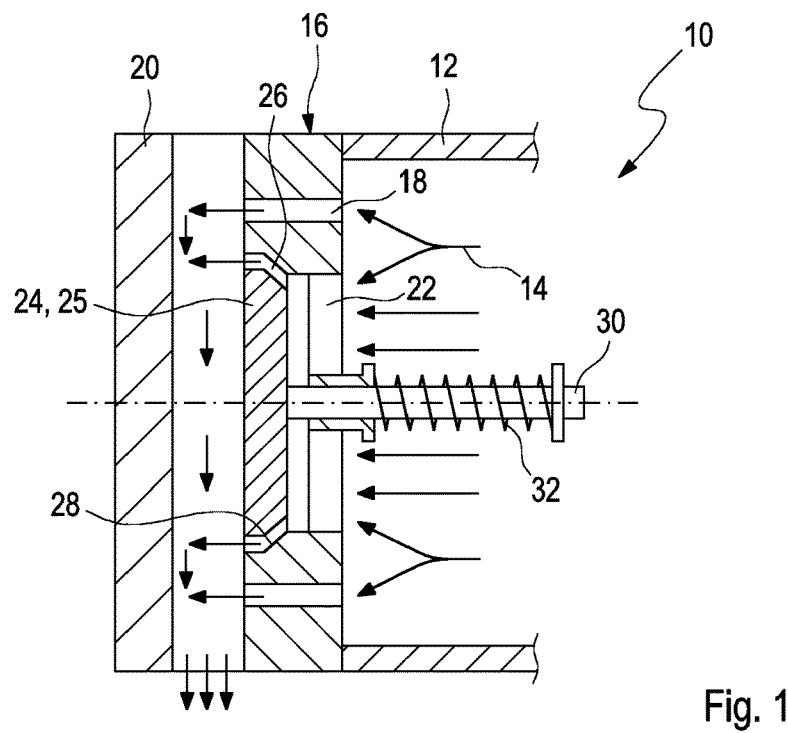
FIG. 1 a sectional illustration through a liquid mist separation device according to a first embodiment, FIG. 2 a top view onto a nozzle plate from the liquid mist separation device from FIG. 1, FIG. 3 a sectional illustration through a liquid mist separation device according to a second embodiment, FIG. 4 a top view onto a nozzle plate from the liquid mist separation device from FIG. 3, FIG. 5 a sectional illustration through a liquid mist separation device according to a third embodiment, FIG. 6 a sectional illustration through a liquid mist separation device according to a non-inventive example, FIG. 7 a sectional illustration through a liquid mist separation device according to a fifth embodiment, and FIG. 8 a sectional illustration through a liquid mist separation device according to a sixth embodiment.
Figure 2:
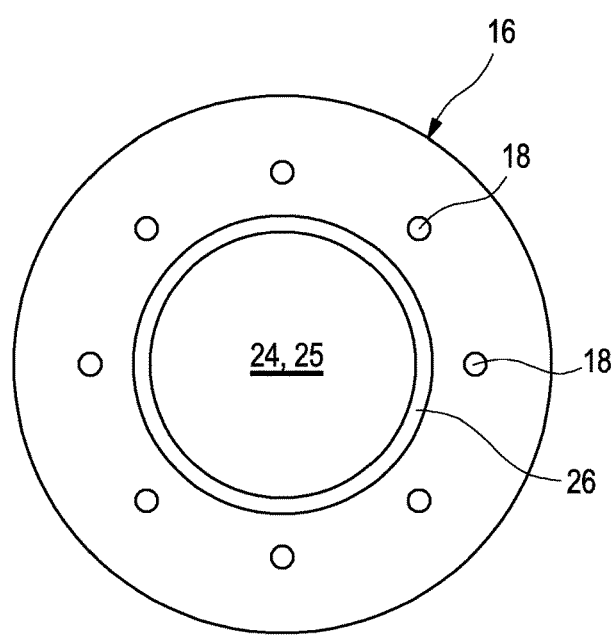

A first embodiment of the liquid mist separation device 10, illustrated in FIGS. 1 to 2, comprises an inlet connecting piece 12, through which a gas flow 14 can flow into the liquid mist separation device 10. The liquid mist separation device 10 is preferably used in a crankcase ventilation device. Here, blow-by gas which is discharged from a crankcase of an internal combustion engine, is freed of oil mist. In addition, the liquid mist separation device 10 has a nozzle plate 16, which is arranged at an inner end of the inlet connecting piece 12.

The nozzle plate 16 has at least one, preferably several, for example eight, nozzles 18, which are formed for example by simple through-bores. The gas flow 14 which flows in through the inlet connecting piece 12 into the liquid mist separation device 10, therefore has to flow through the nozzles 18 of the nozzle plate 16. A baffle plate 20 is arranged opposite the nozzles 18, so that the gas flow 14 which flows through the nozzles 18 is deflected at the baffle plate 20 and at the baffle plate 20 is freed, at least in part, of the liquid mist. The baffle plate 20 is arranged here spaced apart axially with respect to the nozzle plate 16.

In the description and in the enclosed claims, the terms radial, axial and circumferential direction refer to the nozzle plate 16.

In the description and in the enclosed claims, a nozzle 18 is understood to mean a through-opening which forms a reduction of the flow cross-section. The through-opening itself can have a constant nozzle cross-section here. In particular, simple bores in a plate are to be understood as nozzle 18.

The nozzle plate 16 has an opening 22, different from the nozzles 18, which opening forms, together with a valve element 25 embodied as valve plate 24, a variable nozzle 26.

The opening 22 is surrounded by a valve seat 28, against which the valve plate 24 lies in a closed position and therefore closes the variable nozzle 26. In an open position, the valve plate 24 is raised from the valve seat 28 and therefore opens an annular gap, which forms the variable nozzle 26.

Depending on how far the valve plate 24 has been raised from the valve seat 28, the nozzle cross-section of the variable nozzle 26 enlarges.

On the valve plate 24 a guide rod 30 is arranged, on which a spring device 32 engages, which acts upon the valve plate 24 with a force which drives or respectively pushes the valve plate 24 into the closed position.

The valve plate 24 is arranged on the nozzle plate 16 such that the valve plate 24 can be raised from the closed position into the open position by a pressure caused by the gas flow 14.

Through the spring device 32, therefore, the valve plate 24 lies against the valve seat 28 in the case of through-flow rates below a threshold through-flow rate, and therefore closes the variable nozzle 26. In the case of through-flow rates above the threshold through-flow rate, the valve plate 24 begins to rise from the valve seat 28 and therefore opens the variable nozzle 26.

Through this configuration, the nozzles 18 of the nozzle plate 16 and the variable nozzle 26 are aligned in the same direction, namely axially. Thereby, with a single nozzle plate 16, the entire gas flow 14 which flows through all nozzles 18, 26 can be deflected and therefore freed of liquid.

Figure 3:
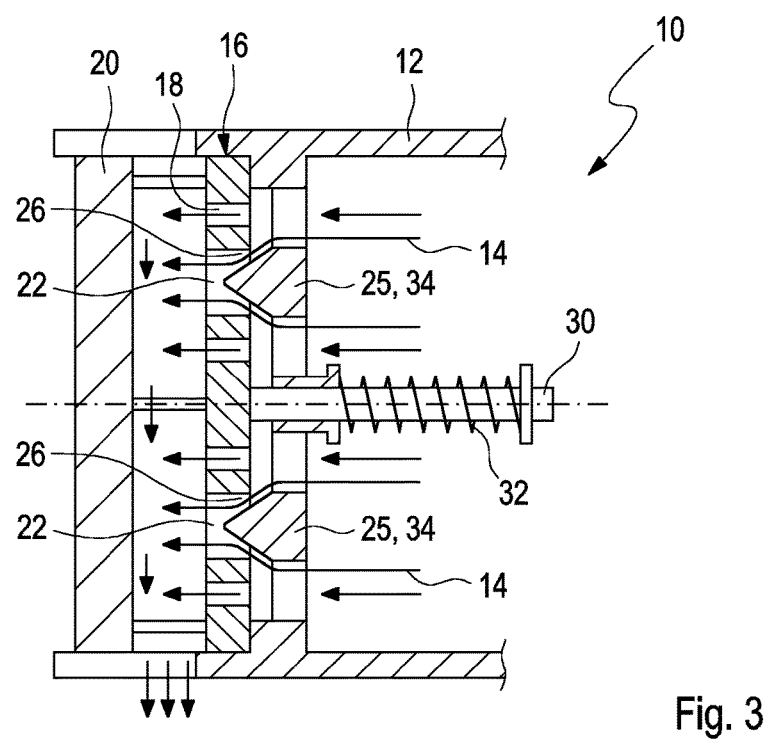
Figure 4:
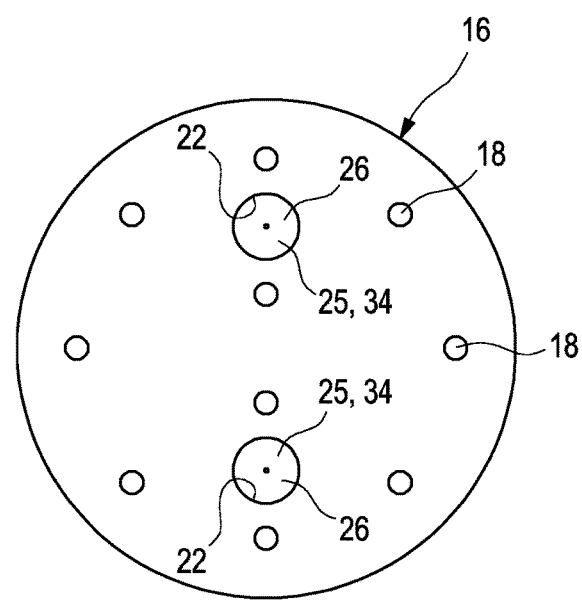

A second embodiment of the liquid mist separation device 10 illustrated in FIGS. 3 and 4 differs from the first embodiment of the liquid mist separation device 10 illustrated in FIGS. 1 and 2 in that the nozzle plate 16 and the baffle plate 20 are arranged so as to be movable in the liquid mist separation device 10. Here, however, a distance is fixed between the baffle plate 20 and the nozzle plate 16 with respect to one another.

Expediently, the baffle plate 20 and nozzle plate 16 form an adjustable unit. Here, the nozzle plate 16 and baffle plate 20 can be separate components which are fastened to one another. Alternatively, the nozzle plate 16 and baffle plate 20 can be formed integrally on said unit. Through the axial mobility of the nozzle plate 16 and of the baffle plate 20, the variability of the variable nozzle 26 is brought about.

For the formation of the variable nozzle 26, in turn at least one, for example two, openings 22 are provided in the nozzle plate 16, which is closed by a valve element 25 of the liquid mist separation device 10.

The valve element 25 is preferably embodied as a fixed closure body 34, therefore held securely in the liquid mist separation device 10, which closure body is embodied for example in a cone-shaped or frustoconical manner.

In the closed position, the respective closure body 34 engages into the respective opening 22 of the nozzle plate 16 and therefore closes the openings 22. On raising of the nozzle plate 16 from the closure bodies 34, an annular gap forms respectively, which forms the variable nozzles 26. Through the cone shape or frustoconical shape, the nozzle cross-section of the variable nozzles 26 enlarges when the distance of the nozzle plate 16 with respect to the closed position increases.

In the second embodiment, instead of the valve plate 24, the composite or respectively the above-mentioned unit of the nozzle plate 16 and the baffle plate 20 is acted upon with a force by the spring device 32. Accordingly, at through-flow rates of the gas flow below a threshold through-flow rate, the composite of nozzle plate 16 and baffle plate 20 lies against the closure bodies 34 and therefore in a closed position. At through-flow rates above the threshold through-flow rate, the composite of nozzle plate 16 and baffle plate 20 rises from the closure bodies 34.

Otherwise, the second embodiment of the liquid mist separation device 10 illustrated in FIGS. 3 and 4 is identical as regards structure and function to the first embodiment of the liquid mist separation device 10 illustrated in FIGS. 1 and 2, the above description of which is to be referred to in this respect.

Figure 5:
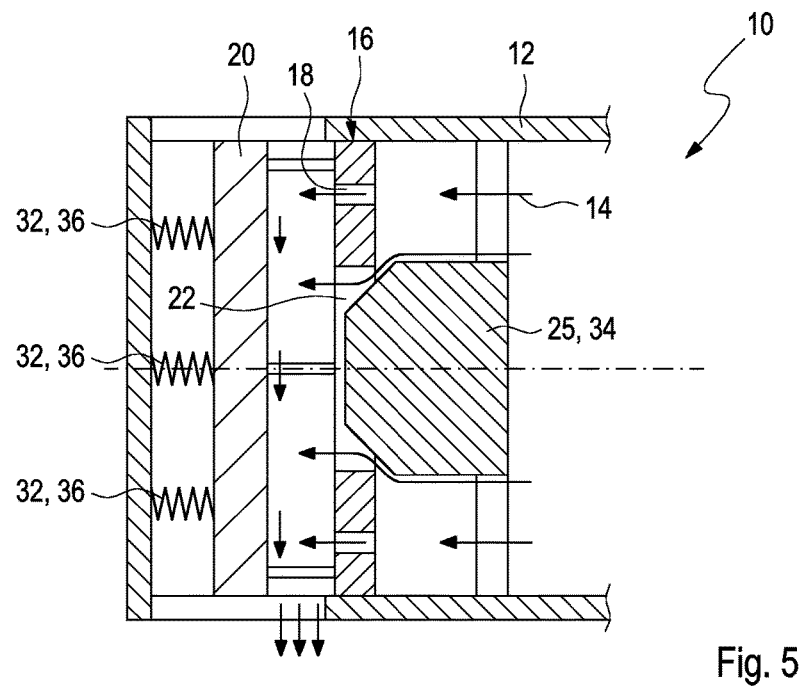

A third embodiment of the liquid mist separation device 10 illustrated in FIG. 5 differs from the second embodiment of the liquid mist separation device 10 illustrated in FIGS. 3 and 4 in that only one opening 22 and only one closure body 34 is provided, which is preferably arranged coaxially to the nozzle plate 16.

Furthermore, the spring device 32 is formed by a plurality of individual spring elements 36, which lie against the movably arranged baffle plate 20. Here, the spring elements 36 lie against a side of the baffle plate 20 which faces away from the nozzle plate 16.

Thereby, the composite of nozzle plate 16 and baffle plate 20 can be pushed by the flow pressure of the gas flow 14 out of the closed position into the open position, wherein the spring elements 36 are compressed.

Otherwise, the third embodiment of the liquid mist separation device 10 illustrated in FIG. 5 is identical as regards structure and function to the second embodiment of the liquid mist separation device 10 illustrated in FIGS. 3 and 4, the above description of which is to be referred to in this respect.

Figure 6:
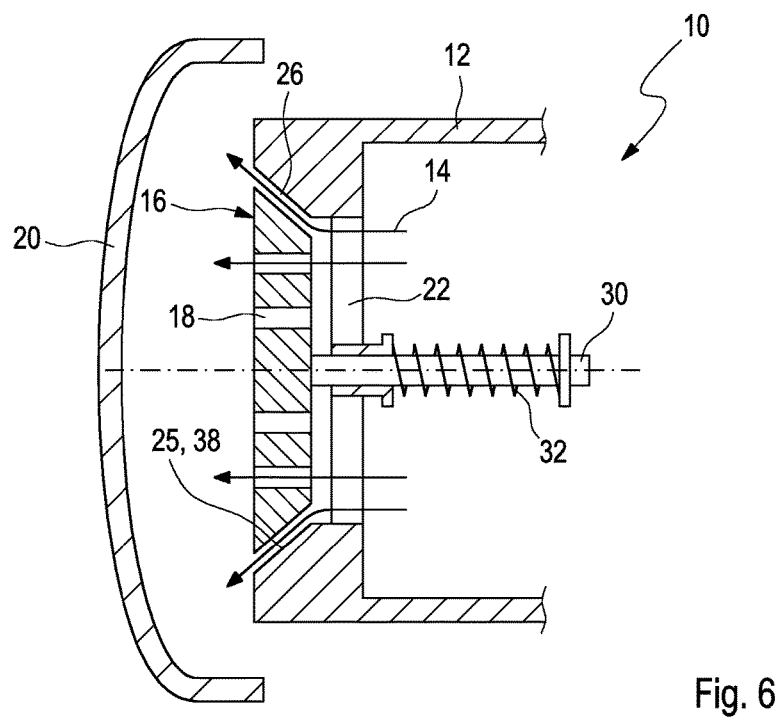

A non-inventive example of the liquid mist separation device 10 illustrated in FIG. 6 differs from the first embodiment of the liquid mist separation device 10 illustrated in FIGS. 1 and 2 in that the nozzle plate 16 is arranged so as to be axially moveable and has no openings different from the nozzles 18. The nozzle plate 16 is configured as a valve plate, which abuts together with a valve element 25, formed on the inlet connecting piece 12, which valve element is configured as valve seat 38.

Therefore, the at least one variable nozzle 26 is formed between the valve seat 38 and the nozzle plate 16. In particular, the variable nozzle 26 is formed radially between an outer edge of the nozzle plate 16 and the valve seat 38.

The nozzle plate 16 according to FIG. 6, like the valve plate 24 according to FIG. 1 or the composite of nozzle plate 16 and baffle plate 20 according to FIG. 3, is acted upon by the spring device 32 with a force in the direction of the closed position. Accordingly, the nozzle cross-section of the variable nozzle 26, which is formed between the nozzle plate 16 and the valve sat 38, adjusts itself.

Otherwise, non-inventive example of the liquid mist separation device 10 illustrated in FIG. 6 is identical as regards structure and function to the first embodiment of the liquid mist separation device 10 illustrated in FIGS. 1 and 2, the above description of which is to be referred to in this respect.

Figure 7:
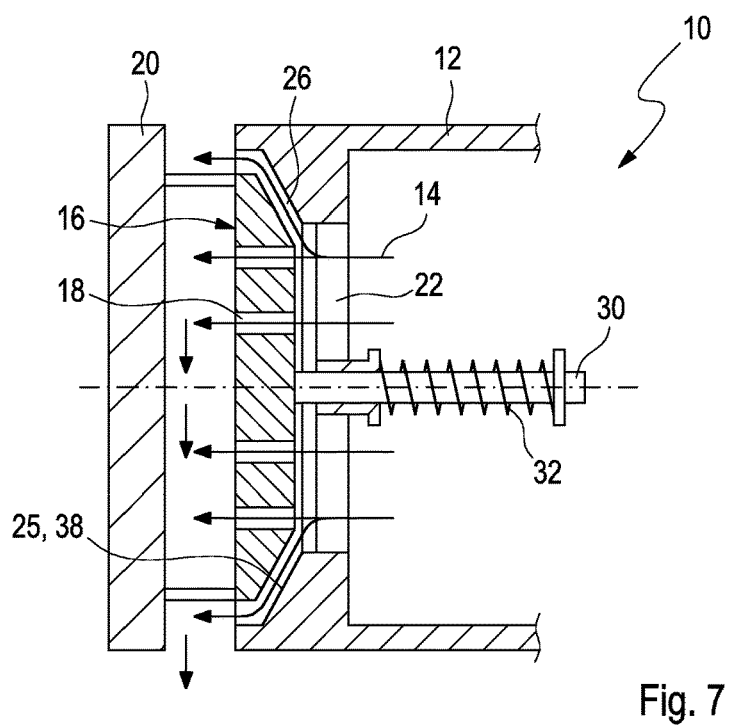

A fifth embodiment of the liquid mist separation device 10 illustrated in FIG. 7 differs from the non-inventive example of the liquid mist separation device 10 illustrated in FIG. 6 in that the baffle plate 20, together with the nozzle plate 16, is arranged so as to be movable in the liquid mist separation device 10. The baffle plate 20 is connected to the nozzle plate 16, so that a distance between the baffle plate and the nozzle plate 16 is constant. Furthermore, the fifth embodiment of the liquid mist separation device 10 illustrated in FIG. 7 differs in that the valve seat 38 has a conical inner surface and a cylindrical inner surface. Through the cylindrical inner surface, which is arranged at the end of the inlet connecting piece 12 facing the baffle plate 20, the gas flow 14 which flows through the variable nozzle 26 is deflected, so that the gas flow 14 strikes axially onto the baffle plate 20 and thereby a good liquid separation can be achieved.

Otherwise, the fifth embodiment of the liquid mist separation device 10 illustrated in FIG. 7 is identical as regards structure and function to the non-inventive example of the liquid mist separation device 10 illustrated in FIG. 6, the above description of which is to be referred to in this respect.

Figure 8:
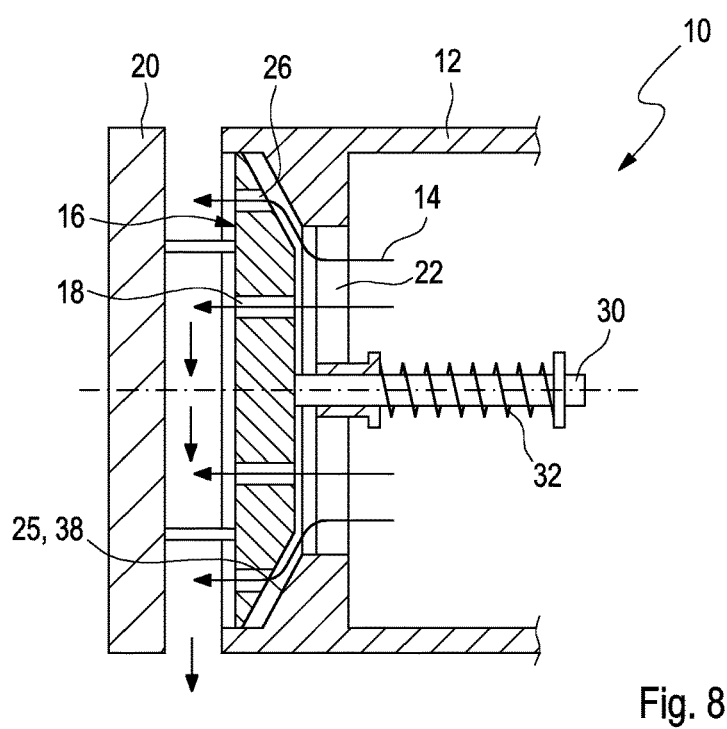

A sixth embodiment of the liquid mist separation device 10 illustrated in FIG. 8 differs from the fifth embodiment of the liquid mist separation device 10 illustrated in FIG. 7 in that the at least one variable nozzle 26, instead of being formed by an annular gap, is formed by a nozzle in the nozzle plate 16 which is covered by the valve seat 38 in the closed position. In order to achieve this, the variable nozzles 26 are arranged in a radially externally lying region of the nozzle plate 16. Thereby, the conical inner surface of the valve seat 28 lies against the variable nozzles 26 when the nozzle plate 16 is situated in the closed position, so that the variable nozzles 26 are closed.

When the nozzle plate 16 moves from the closed position into the open position, the variable nozzles 26 are therefore freed and the overall nozzle flow cross-section of the liquid mist separation device 10 is increased.

Otherwise, the sixth embodiment of the liquid mist separation device 10 illustrated in FIG. 8 is identical as regards structure and function to the fifth embodiment of the liquid mist separation device 10 illustrated in FIG. 7, the above description of which is to be referred to in this respect.

The invention claimed is:

1. A liquid mist separation device for separating liquid from a gas flow comprising:
   a nozzle plate including at least one nozzle which is permanently open at least in part and through which the gas flow flows;
   at least one baffle plate arranged opposite the at least one nozzle which deflects the gas flow and on which liquid droplets precipitate;
   at least one valve element which, together with the nozzle plate, forms at least one variable nozzle having a variable nozzle cross-section;
   the at least one variable nozzle arranged fluidically parallel to the at least one nozzle;
   the nozzle plate and the at least one valve element arranged axially displaceable relative to each other;
   the nozzle plate and the at least one baffle plate disposed at a fixed distance with respect to one another; and
   opposite the at least one nozzle and the at least one variable nozzle a baffle plate is arranged, which deflects the gas flow emerging from the respective nozzle and on which liquid droplets precipitate.

2. The liquid mist separation device according to claim 1, wherein:
   the at least one valve element is a movably arranged valve plate, which in a closed position closes an opening of the nozzle plate, and which in an open position defines, together with the nozzle plate, an annular gap; and
   a spring device is provided, which acts upon the valve plate with a force in a direction of the closed position.

3. The liquid mist separation device according to claim 1, wherein the nozzle plate and the baffle plate are axially displaceable in the liquid mist separation device.

4. The liquid mist separation device according to claim 3, wherein:
   the at least one valve element is a fixed closure body;
   the nozzle plate further includes an opening for the closure body;
   in a closed position of the nozzle plate, the closure body engages into the corresponding opening of the nozzle plate and closes the opening; and
   in an open position of the nozzle plate, the opening and the closure body define an annular gap.

5. The liquid mist separation device according to claim 3, wherein:
   the at least one valve element is a valve seat, which surrounds an opening of an inlet connecting piece;
   in a closed position of the nozzle plate, the nozzle plate lies against the valve seat and covers the opening of the inlet connecting piece; and
   in an open position of the nozzle plate, an annular gap is defined between the nozzle plate and the valve seat.

6. The liquid mist separation device according to claim 3, wherein:
   the at least one valve element is a valve seat which surrounds an opening of an inlet connecting piece;
   in a closed position of the nozzle plate, the nozzle plate lies against the valve seat and covers the opening of the inlet connecting piece; and
   in an open position of the nozzle plate, the at least one nozzles is exposed, which in the closed position is covered by the valve seat.

7. The liquid mist separation device according to claim 4, further comprising a spring device, which acts upon the nozzle plate with a force in a direction of the closed position.

8. The liquid mist separation device according to claim 1, wherein the at least one variable nozzle and the at least one nozzle are directed in a common nozzle direction.

9. The liquid mist separation device according to claim 4, wherein the closure body is structured in one of i) a cone shape and ii) a frustoconical manner.

10. The liquid mist separation device according to claim 3, wherein:

the at least one valve element includes a plurality of valve elements, the plurality of valve elements structured as a plurality of fixed closure bodies;

the nozzle plate includes a plurality of openings, each closure body corresponding to an opening;

the closure body engages into the corresponding opening of the nozzle plate and closes the corresponding opening when the nozzle plate is in a closed position; and the closure body and the corresponding opening define an annular gap when the nozzle plate is in an open position.

11. A liquid mist separation device for separating liquid from a gas flow comprising:

a nozzle plate including at least one nozzle, the at least one nozzle structured such that the gas flow is flowable therethrough and to be at least partially open permanently;

at least one valve element which, together with the nozzle plate, form at least one variable nozzle, the at least one variable nozzle having a variable nozzle cross-section; and a plurality of baffle plates on which liquid droplets precipitate, the plurality of baffle plates respectively arranged opposite a corresponding nozzle of the at least one nozzle and the at least one variable nozzle such that the plurality of baffle plates respectively deflect the gas flow exiting the corresponding nozzle;

wherein the at least one nozzle and the at least one variable nozzle are arranged fluidically parallel to one another and directed in a common nozzle direction; and wherein the nozzle plate and the at least one valve element are axially displaceable relative to one another, and the nozzle plate and the plurality of baffle plates are disposed at a fixed distance from one another.

12. The liquid mist separation device according to claim 11, further comprising a spring device, wherein:

the at least one valve element is a movably arranged valve plate, which in a closed position closes an opening of the nozzle plate, and which in an open position defines, together with the nozzle plate, an annular gap; and the spring device acts upon the valve plate with a force in a direction of the closed position.

13. The liquid mist separation device according to claim 11, wherein the nozzle plate and the plurality of baffle plates are axially displaceable.

14. The liquid mist separation device according to claim 13, wherein:

the at least one valve element is a fixed closure body;

the nozzle plate further includes an opening for the closure body;

the closure body engages into the corresponding opening of the nozzle plate and closes the opening when the nozzle plate is in a closed position; and the opening and the closure body define an annular gap when the nozzle plate is in an open position.

15. The liquid mist separation device according to claim 14, further comprising a spring device, which acts upon the nozzle plate with a force in a direction of the closed position.

16. The liquid mist separation device according to claim 13, wherein:

the at least one valve element is a valve seat surrounding an opening of an inlet connecting piece;

the nozzle plate lies against the valve seat and covers the opening of the inlet connecting piece when the nozzle plate is in a closed position; and an annular gap is defined between the nozzle plate and the valve seat when the nozzle plate is in an open position.

17. The liquid mist separation device according to claim 13, wherein:

the at least one valve element is a valve seat surrounding an opening of an inlet connecting piece;

the nozzle plate lies against the valve seat and covers the opening of the inlet connecting piece when the nozzle plate is in a closed position; and the at least one nozzle is exposed when the nozzle plate is in an open position, and the at least one nozzle is covered by the valve seat when the nozzle plate is in the closed position.

18. A liquid mist separation device for separating liquid from a gas flow comprising:

a nozzle plate including at least one nozzle and a plurality of openings, the at least one nozzle structured such that the gas flow is flowable therethrough and to be at least partially open permanently;

a plurality of valve elements which, together with the nozzle plate, form at least one variable nozzle, the at least one variable nozzle having a variable nozzle cross-section; and a plurality of baffle plates on which liquid droplets precipitate, the plurality of baffle plates respectively arranged opposite a corresponding nozzle of the at least one nozzle and the at least one variable nozzle such that the plurality of baffle plates respectively deflect the gas flow exiting the corresponding nozzle;

wherein the at least one nozzle and the at least one variable nozzle are arranged fluidically parallel to one another and directed in a common nozzle direction; and wherein the nozzle plate and the at least one valve element are axially displaceable relative to one another, and the nozzle plate and the plurality of baffle plates are disposed at a fixed distance from one another.

19. The liquid mist separation device according to claim 18, wherein the nozzle plate and the plurality of baffle plates are axially displaceable.

20. The liquid mist separation device according to claim 19, wherein:

the plurality of valve elements are structured as a plurality of fixed closure bodies, each closure body corresponding to an opening of the plurality of openings;

the closure body engages into the corresponding opening of the nozzle plate and closes the corresponding opening when the nozzle plate is in a closed position; and the closure body and the corresponding opening define an annular gap when the nozzle plate is in an open position.

* * * * *